March 12, 1968 — J. J. STERLING — 3,372,590
THERMAL FLOWMETER
Filed Oct. 1, 1965 — 3 Sheets-Sheet 1
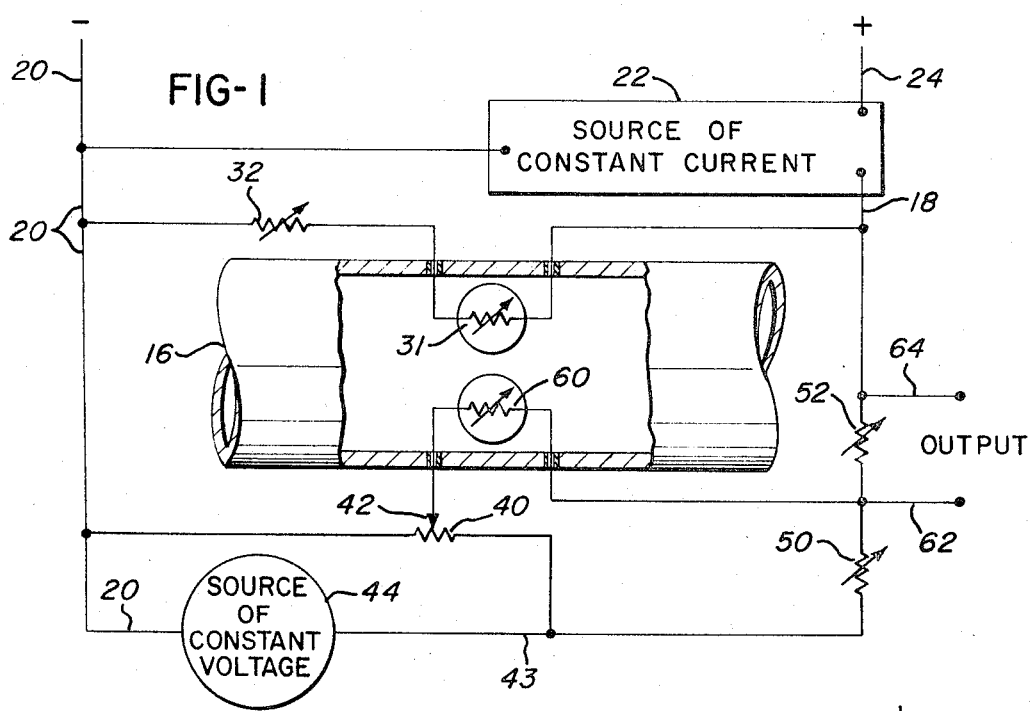
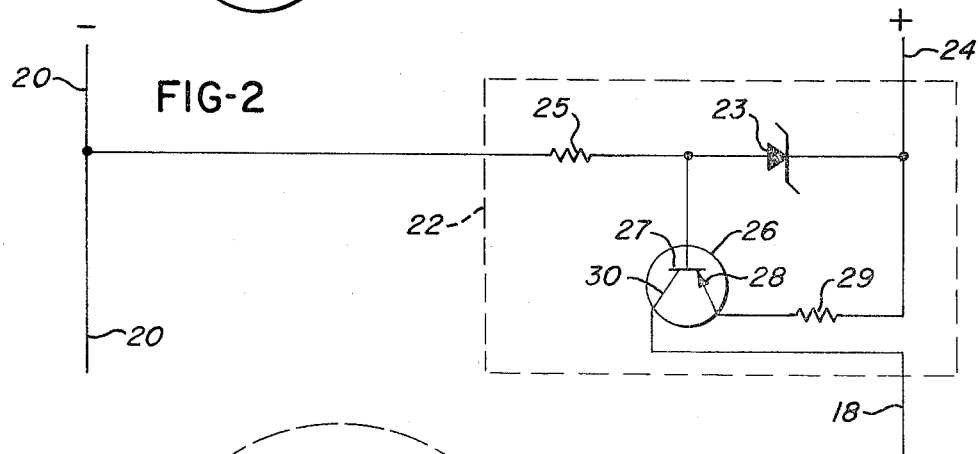
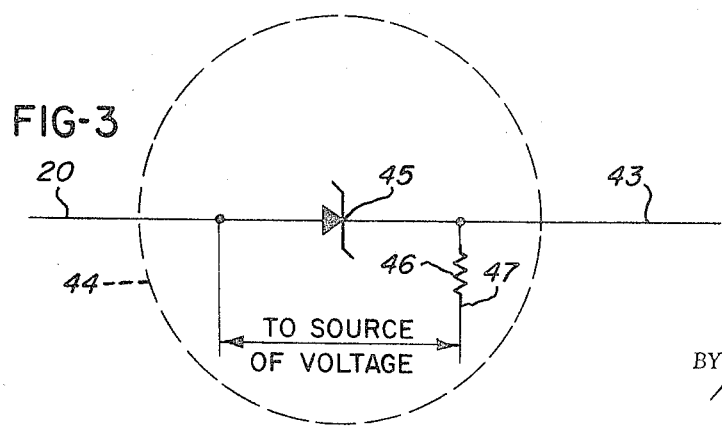
INVENTOR.
JOHN JEROME STERLING
BY *William R. Jacox*
ATTORNEY March 12, 1968     J. J. STERLING     3,372,590
THERMAL FLOWMETER
Filed Oct. 1, 1965     3 Sheets-Sheet 2
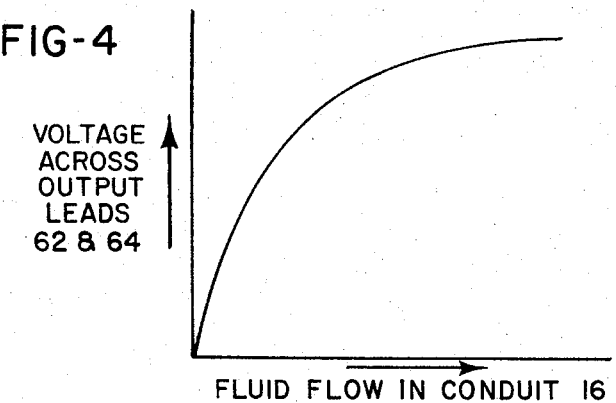
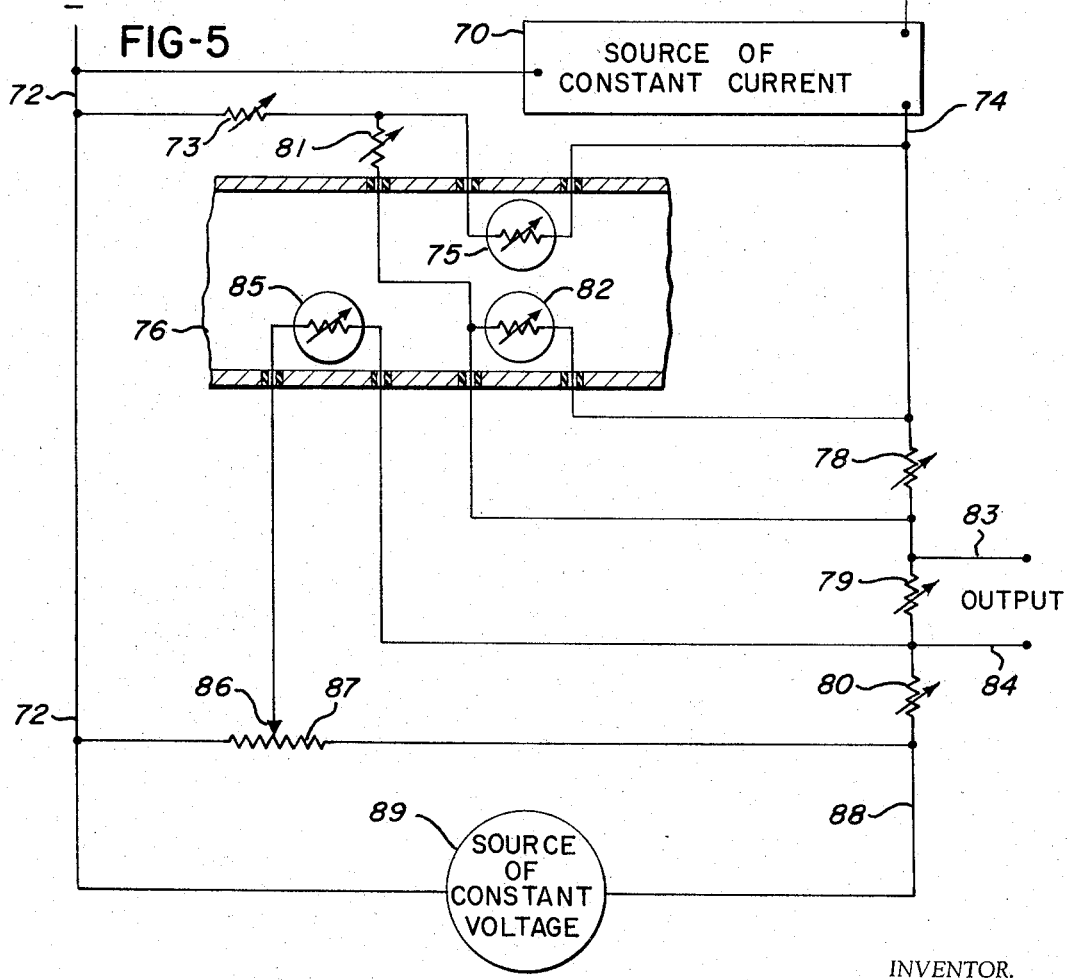
INVENTOR.
JOHN JEROME STERLING
BY *William R Jacox*
ATTORNEY March 12, 1968  J. J. STERLING  3,372,590
THERMAL FLOWMETER
Filed Oct. 1, 1965  3 Sheets-Sheet 3
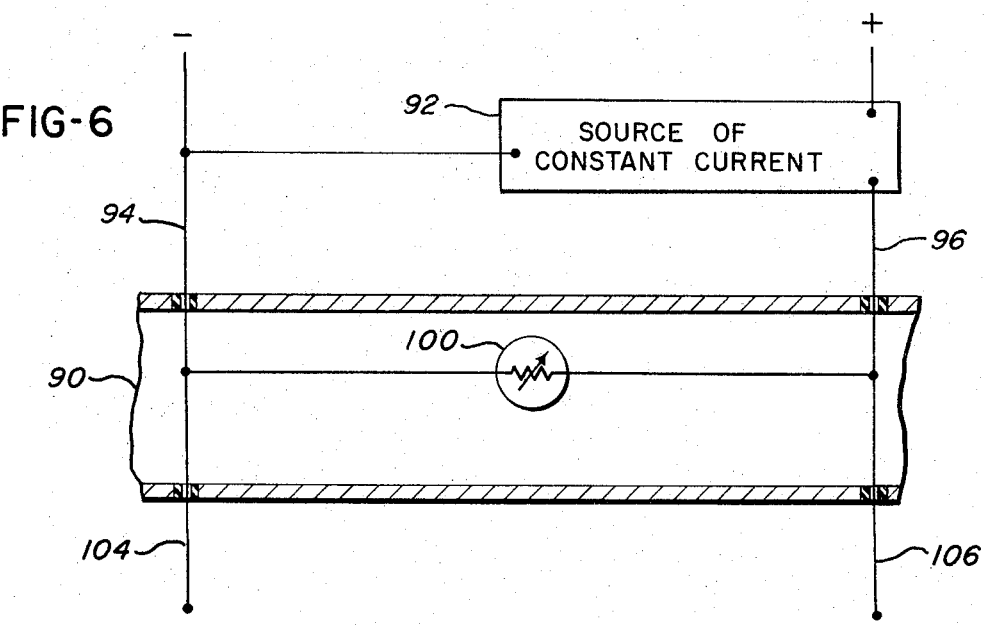
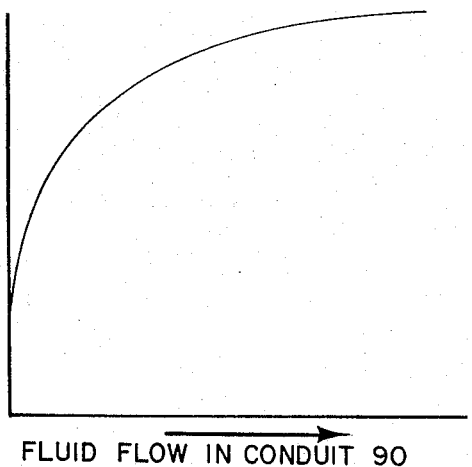
INVENTOR.
JOHN JEROME STERLING
BY William R Jacox
ATTORNEY

United States Patent Office 3,372,590
Patented Mar. 12, 1968

3,372,590
THERMAL FLOWMETER
John Jerome Sterling, Yellow Springs, Ohio, assignor to Technology Incorporated, Dayton, Ohio, a corporation of Ohio
Filed Oct. 1, 1965, Ser. No. 492,180
14 Claims. (Cl. 73—204)

ABSTRACT OF THE DISCLOSURE

This invention relates to a mass flowmeter. The invention relates more particularly to an instrument for indicating and/or measuring mass flow rate of a fluid. A flowmeter having a thermally responsive element which provides a signal in accordance with the mass rate of flow. The thermally responsive element is connected to a constant current source which raises the temperature of the element above the temperature of the fluid so that changes in the rate of flow will change the impedance of the element as a function of mass rate of flow. The output circuit of the thermal element is connected to a temperature compensating circuit. The compensation circuit means include a constant voltage source and one or more additional temperature sensitive impedance means imposed in the fluid.

Background of the invention

This invention relates to the invention disclosed in patent application Ser. No. 241,583, filed Dec. 3, 1962, now Patent No. 3,220,255, which is owned by the assignee of this application.

Various types of fluid flowmeters have been devised. Various types of electrical energy excitation and temperature compensation means have been used in regard to flowmeters. However, all types of excitation and temperature compensation means previously employed have had objectionable features or results or limitations.

An object of this invention is to provide an instrument which is capable of sensing and/or measuring mass rate of fluid flow under varying conditions of temperature and pressure thereof.

Another object of this invention is to provide a mass flowmeter which has a wide dynamic range of operation.

Another object of this invention is to provide such a mass flowmeter which has a high degree of sensitivity at all rates of fluid flow within the range of the instrument.

Another object of this invention is to provide an instrument for sensing and/or measuring mass rate of fluid flow which instrument has rapid response to changes in mass rate of fluid flow.

Another object of this invention is to provide such an instrument which, per se, has automatic protection against thermal damage or destruction of the mass sensor elements.

Another object of this invention is to provide such an instrument which offers an extremely small obstruction to fluid flow.

Another object of this invention is to provide such an instrument which has a small number of elements or components.

Another object of this invention is to provide such an instrument which is self-contained, rugged, and which is comparatively light in weight and small in physical size.

Other objects and advantages reside in the construction of the invention, combinations thereof, the method of manufacture, and the mode of operation, as will become more apparent from the following description.

In the drawings:

FIGURE 1 is a schematic wiring diagram of an instrument of this invention for sensing and/or measuring mass rate of fluid flow.

FIGURE 2 is a schematic diagram of circuitry which may be employed as a part of the instrument of FIGURE 1.

FIGURE 3 is a schematic diagram of circuitry which may be employed as a part of the instrument of FIGURE 1.

FIGURE 4 is a diagram illustrating the operation of the instrument of FIGURE 1.

FIGURE 5 is a schematic wiring diagram of another instrument of this invention.

FIGURE 6 is a schematic wiring diagram of another instrument of this invention.

FIGURE 7 is a diagram illustrating the operation of the instrument shown in FIGURE 6.

Referring to the drawings in detail, FIGURE 1 illustrates a fluid conduit 16 through which fluid flows. The apparatus or instrument of this invention senses and/or measures mass rate of fluid flow through the conduit 16.

Electrical conductors 18 and 20 are connected to any suitable source of constant current 22. FIGURE 2 illustrates circuitry which may be employed as a source of constant current 22. However, any other suitable source of constant current electrical energy may be employed. In the circuitry of FIGURE 2, a Zener type of diode 23 connects to an input lead 24. In series with the diode 23 is a resistor 25 which is joined to the conductor 20. The conductor 20 also serves as an input lead to the source of constant current 22. A transistor 26 has a base 27 connected to the junction between the diode 23 and the resistor 25. An emitter 28 of the transistor 26 is connected to the input lead 24 through a resistor 29. A collector 30 of the transistor 26 is joined to the conductor 18.

The conductor 18 connects to a temperature sensitive resistance element or thermistor 31, shown in FIGURE 1. The resistance element 31 has a negative temperature characteristic, i.e., the resistance thereof decreases with increase in the temperature thereof and vice versa. The resistance element 31 is positioned within the conduit 16.

Connected in series relationship with the resistance element 31 is an adjustable resistor 32 which is connected to the conductor 20. The current flow through the resistance element 31 is of a value to cause heating of the resistance element 31 above the temperature of the fluid within the conduit 16. Thus, the resistance element or thermistor 31 is said to be operated in its self-heating region.

A resistor member 40 is connected to the conductor 20 and has an adjustable tap 42. The resistor 40 is also joined to a conductor 43. Connected to the conductors 20 and 43 and in parallel relationship with the resistor member 40 is any suitable source of constant voltage 44.

FIGURE 3 illustrates circuitry which may be employed as a source of constant voltage. However, any other suitable source of constant voltage may be employed. In the circuitry of FIGURE 3, a Zener type of diode 45 is connected to the conductors 20 and 43. A resistor 46 is also connected to the conductor 43. The resistor 46 has joined thereto a lead 47 which, with the conductor 20, is connected to a suitable source of voltage, as illustrated.

As shown in FIGURE 1, joined to the tap 42 of the resistor member 40 is a temperature sensitive resistance element or thermistor 60 which, as shown herein, has a negative temperature characteristic. The resistance element 60 is also connected to an adjustable resistor 50 and to an adjustable resistor 52 at a position intermediate the resistors 50 and 52. The resistance element 60 is disposed within the conduit 16 and senses the temperature of the fluid in the conduit 16.

The resistor 52 is connected to the conductor 18 while the resistor 50 is connected to the conductor 43.

Also, joined to the junction between the resistor 50 and the resistor 52 is an output lead 62. An output lead 64 is connected to the conductor 18; thus, the adjustable resistor 52 is connected across the output leads 62 and 64.

Before operation of the apparatus or instrument illustrated in FIGURE 1, certain temperature compensation adjustments are made.

Temperature changes of the fluid in the conduit 16 affect the voltage across the temperature sensitive resistance element 31. In operation of the instrument or apparatus of FIGURE 1, the voltage across the output leads 62 and 64 must be constant at zero fluid flow, independent of temperature. To effect zero flow temperature compensation, the temperature of the fluid in the conduit 16 is varied within the operating range of the instrument while zero fluid flow is maintained. The resistance of the resistance element 60 and thus the voltage thereacross varies with the temperature of the fluid in the conduit 16. The resistance element 60 serves as a part of a circuit for temperature compensation of the instrument or apparatus of FIGURE 1.

The source of constant voltage 44 across the resistor 40, and through the tap 42, provides a substantially constant voltage to a zero fluid flow temperature compensation circuit comprising the resistance element 60 and the adjustable resistor 50. Adjustment of the tap 42 of the resistor 40 determines the degree of temperature compensation of the zero temperature compensation circuit. This is due to the fact that adjustment of the tap 42 changes the voltage provided across the series combination of the resistor element 60 and the adjustable resistor 50. Thus, the tap 42 is adjusted to obtain zero change in voltage across the output leads 62 and 64 at zero fluid flow and throughout the temperature range of the instrument. Zero fluid flow temperature compensaion is completed by adjusting the adjustable resistor 32 to obtain zero voltage across the output leads 62 and 64 at zero fluid flow, if so required.

The next adjustment in the temperature compensation circuitry is made with maximum rated fluid flow through the conduit 16. The temperature of the fluid in the conduit 16 is varied throughout the operating temperature range of the instrument while maximum fluid flow is maintained. The resistor 52 and the resistor 50 are adjusted so that there is no substantial change in the output voltage across the output leads 62 and 64 while the temperature of the fluid in the conduit 16 is varied throughout the operating range of the instrument and while maximum fluid flow is maintained.

After these adjustments are completed, operation of the instrument provides a voltage across the output leads 62 and 64 which is a function of the mass rate of fluid flow in the conduit 16, substantially independent of temperature of the fluid in the conduit 16.

The source of constant current 22 maintains the current flow through the resistance element 31 at a substantially constant value. As stated above, the current flow through the resistance element 31 is of a value to cause heating of the resistance element 31 above the temperature of the fluid flowing within the conduit 16. Thus, the resistance element 31 is always operated in its self-heating region.

The quantity of heat transferred from the self-heated resistance element 31 to the fluid in the conduit 16 is a function of the mass rate of fluid flow in the conduit 16. Hence, as mass rate of fluid flow increases, the quantity of heat transferred to the fluid by the resistance element 31 increases, thereby decreasing the temperature of the resistance element 31. Thus, the resistance of the resistance element 31 increases and the voltage thereacross increases. As the mass rate of fluid flow decreases, the quantity of heat transferred to the fluid by the resistance element 31 decreases, thereby increasing the temperature of the resistance element 31. Thus, the resistance of the resistance element 31 decreases and the voltage thereacross decreases. Therefore, the voltage across the resistance element 31 changes with changes in the quantity of heat dissipated from the resistance element 31 to the fluid in the conduit 16.

While such heat transfer between the resistance element 31 and the fluid occurs, the temperature compensation circuitry discussed above compensates for changes in temperature of the fluid in the conduit 16. Thus, the instrument illustrated by FIGURE 1 operates to provide an output voltage across the output leads 62 and 64 which is substantially independent of the temperature of the fluid within the conduit 16.

The voltage across the output leads 62 and 64 may be represented by the curve of FIGURE 4 of the drawings.

It is to be understood that under certain conditions of operation, portions of the temperature compensation circuit of the instrument of FIGURE 1 may not be required. For example, if zero or small value mass flow rates are not to be considered, the compensation for temperature changes at zero fluid flow may be removed from the circuitry. This is accomplished by removing or eliminating the effects of the adjustable resistor 40, for example, by connecting the tap 42 of the resistor 40 to the conductor 43. On the other hand, if it is desired to indicate or measure mass flow rates in a region of small value mass flow rates or at zero flow, the compensation for temperature changes at full flow may be removed from the circuitry by removing the resistor 52 or by otherwise eliminating the effects of the adjustable resistor 52 in the circuit.

It is to be understood that in an instrument of this invention more than one mass fluid flow sensing element, such as the resistance element 31, operated in its self-heating region, may be used. Also, more than one temperature sensing resistance element, such as the resistance element 60, may be employed in a temperature compensation circuit of an instrument of this invention.

FIGURE 5 illustrates an instrument of this invention in which a source of constant current 70 provides electrical energy to conductors 72 and 74. A temperature sensitive resistance element or thermistor 75 is disposed within a fluid conduit 76 and is connected to the conductors 72 and 74 through a resistor 73, herein shown as being adjustable. The resistance element 75 has a negative temperature resistance characteristic and is operated in its self-heating region as the current therethrough is of a value to cause heating thereof above the temperature of the fluid in the conduit 76.

Connected in series relationship to the conductor 74 are adjustable resistor members 78, 79, and 80.

Connected across the resistor member 78 is a temperature sensitive resistance element or thermistor 82 which, as shown herein, has a negative temperature characteristic. The resistance element 82 is disposed within the fluid conduit 76.

A resistor 81 is joined to the junction between the temperature sensitive resistance element 75 and the resistor 73. The resistor 81 is also connected to the resistance element 82.

Connected across the resistor member 79 are output leads 83 and 84.

A temperature sensitive resistance element or thermistor 85, shown herein as having a negative temperature characteristic, is also disposed within the fluid conduit 76. The resistance element 85 is connected to the junction between the resistor members 79 and 80. The resistance element 85 is also connected to a tap 86 of a resistor member 87. The resistor member 87 is connected to the conductor 72 and to a conductor 88. The conductor 88 is connected to the resistor member 80 and to any suitable source of constant voltage 89. The source of constant voltage 89 is also joined to the conductor 72.

The temperature sensitive resistance element 75, operating in its self-heating region, senses mass rate fluid flow in the conduit 76. The resistance elements 82 and 85 and the circuitry to which they are connected serve as temperature compensation means at zero flow and/or at any other flow value within the rating of the instrument. Thus, the instrument of FIGURE 5 provides a voltage across the output leads 83 and 84 which is a function of mass rate of fluid flow in the conduit 76, substantially independent of the temperature of the fluid. Therefore, during operation of the instrument illustrated in FIGURE 5, the voltage across the output leads 83 and 84 is substantially as illustrated in FIGURE 4.

Thus, an instrument of this invention as illustrated by FIGURES 1 and 5 provides means for measuring and/or indicating mass rate of fluid flow, independent of temperature or pressure of the fluid.

FIGURE 6 of the drawings illustrates an instrument of this invention which may be used to indicate and/or measure mass rate of fluid flow in a conduit 90 within which the temperature of the fluid is maintained at a substantially constant value.

A source of constant current 92 has conductors 94 and 96 joined thereto. A temperature sensitive resistance element or thermistor 100 having a negative temperature characteristic is connected to the conductors 94 and 96. The value of the constant current flow through the resistance element 100 is of a value to heat the resistance element 100 to a temperature above the temperature of the fluid within the conduit 90. Thus, the resistance element 100 is operated in its self-heating region.

Output leads 104 and 106 are connected to the resistance element 100 so that the voltage across the output leads 104 and 106 varies with the voltage across the resistance element 100.

Thus, during operation of the instrument shown in FIGURE 6 the voltage across the output leads 104 and 106 with respect to mass fluid flow in the conduit 90 appears substantially as illustrated in FIGURE 7.

As discussed with respect to the instruments of this invention illustrated in FIGURES 1, 5, and 6, constant current electric energy is used to supply current to each resistance element or thermistor which is operated in the self-heating region. Therefore, for measuring or indicating fluid flow through any orifice or flow passage of a given dimension, the dynamic range of an instrument of this invention is wider than would otherwise be possible. This is due to the fact that in an instrument of this invention power dissipation ($I^2R$) of each self-heated thermistor increases with increasing fluid flow, independent of fluid temperature. Therefore, a greater temperature differential of the self-heated resistance element with respect to the fluid temperature is maintained than would otherwise be possible. Consequently, the sensitivity of the instrument is very high. In each instrument of this invention discussed above, with the exception of that shown in FIGURE 6, the sensitivity is substantially independent of the temperature of the fluid at all flow rates thereof.

Furthermore, due to the fact that the current flow through each of the resistance elements which is operated in its self-heating region is maintained at a substantially constant value, the operating temperature of the self-heated resistance element never reaches an excessive value.

The transfer function of thermistors of the same type is similar with respect to mass fluid flow, with the only significant change being in sensitivity to temperature of the fluid. Due to the fact that constant current electrical energy is used to supply current to each resistance element or thermistor which is operated in its self-heating region, no substantial change in linearity occurs by the substitution of such a thermistor of the same type. In other words, the linearity of the output of the instrument, as illustrated in FIGURES 4 and 7, does not change if any given self-heated resistance element in the instrument is replaced by another resistance element of the same type, if need for such replacement should occur.

Furthermore, due to the fact that constant current electrical energy is employed in an instrument of this invention, the adjustments for temperature compensation, discussed above, may be easily and readily carried out.

Any suitable means may be connected to the output leads of an instrument of this invention. The output leads 62 and 64 of the instrument illustrated in FIGURE 1 or the output leads 83 and 84 of FIGURE 5 or the output leads 104 and 106 of the instrument illustrated in FIGURE 6 may be connected to any suitable indicating and/or measuring means.

The output leads may be connected to amplifier means. If desired, the output leads may be connected to a function generator or the like to provide a substantially straight line relationship or other relationship between the voltage across the output leads and the mass rate of fluid flow in the conduit.

Although the preferred embodiment of the device has been described, it will be understood that within the purview of this invention, various changes may be made in the form, details, proportion and arrangement of parts, the combination thereof and mode of operation, which generally stated consist in a device capable of carrying out the objects set forth, as disclosed and defined in the appended claims.

The invention thus having been described, the following is claimed:

1. Fluid mass rate flow sensing apparatus for use with a fluid conduit having fluid therein comprising:
   a source of constant current electrical energy,
   first temperature sensitive impedance means within the conduit, the first temperature sensitive impedance means having a negative temperature characteristic,
   means connecting the first temperature sensitive impedance means to the source of constant current electrical energy,
   current flow through the first temperature sensitive impedance means from the source of constant current electrical energy being of a value to cause self-heating of the first temperature sensitive impedance means to a temperature above the temperature of the fluid in the conduit so that an increase in fluid mass rate of flow in the conduit causes cooling of the first temperature sensitive impedance means, hence causing an increase in impedance of the first temperature sensitive impedance means and thus causing an increase in voltage thereacross, said voltage across the first temperature sensitive impedance means thus being a function of the mass rate of flow of the fluid in the conduit,
   output circuit means,
   connection means joining the first temperature sensitive impedance means to the output circuit means,
   the connection means including resistance means and voltage regulator means joined to the resistance means,
   second temperature sensitive impedance means within the conduit and connected to the resistance means,
   a differential voltage thus being provided to the output circuit means which voltage is a function of the mass rate of fluid flow in the conduit, substantially independent of temperature and pressure of the fluid.

2. Fluid mass rate flow sensing apparatus for use with a fluid conduit having fluid therein comprising:
   a source of constant current electrical energy,
   first temperature sensitive impedance means within the conduit, the first impedance means having a negative temperature characteristic,
   means connecting the first temperature sensitive impedance means to the source of constant current electrical energy, the current flow through the first temperature sensitive impedance means from the source of constant current electrical energy being of a value to heat the first temperature sensitive impedance means to a temperature above the temperature of the fluid in the conduit, output circuit means, temperature compensation means including second temperature sensitive impedance means within the conduit and a source of substantially constant voltage connected thereto, the temperature compensation means also including means connecting the first temperature sensitive impedance means to the output circuit means so that a differential voltage is provided to the output circuit means which is a function of the mass rate of fluid flow in the conduit but which is substantially independent of temperature.

3. Fluid mass rate flow sensing apparatus for use with a fluid conduit having fluid therein comprising:

a source of constant current electrical energy, first temperature sensitive impedance means within the conduit and connected to the source of constant current electrical energy, the first temperature sensitive impedance means having a negative temperature characteristic, the first temperature sensitive impedance means having a first lead and second lead so that current flows from one of said leads through the first temperature sensitive impedance means and then to the other of said leads, the magnitude of the current flow through the first temperature sensitive impedance means being of a value to cause self-heating of the first temperature sensitive impedance means to a temperature above the temperature of the fluid in the conduit so that an increase in fluid mass rate of flow causes cooling of the first temperature sensitive impedance means, hence causing an increase in impedance of the first temperature sensitive impedance means and thus causing an increase in voltage thereacross, said voltage across the first temperature sensitive impedance means thus being a function of the mass rate of flow of the fluid in the conduit, a pair of output conductors, means connecting the first lead of the first temperature sensitive impedance means to one of the output conductors, resistor means, means connecting the second lead of the first temperature sensitive impedance means to the resistor means, means connecting the resistor means to the second output conductor, a source of constant voltage, means connecting the resistor means and the source of constant voltage in parallel relationship, second temperature sensitive impedance means within the conduit, the second temperature sensitive impedance means having a negative temperature characteristic, means connecting the second temperature sensitive impedance means to the second output conductor and to the resistor means, a differential voltage thus being provided to the output conductors which is a function of the mass rate of fluid flow in the conduit and substantially independent of the temperature of the fluid in the conduit.

4. Fluid mass rate flow sensing apparatus for use with a fluid conduit having fluid therein comprising:

a source of constant current electrical energy, first temperature sensitive impedance means within the conduit and connected to the source of constant current electrical energy, the first temperature sensitive impedance means having a negative temperature characteristic, current flow through the first temperature sensitive impedance means being of a value to heat the first temperature sensitive impedance means above the temperature of the fluid in the conduit, the first temperature sensitive impedance means having a first lead and a second lead so that current flows from one of said leads through the first temperature sensitive impedance means and then to the other of said leads, the magnitude of the current flow through the first temperature sensitive impedance means being of a value to cause self-heating of the first temperature sensitive impedance means to a temperature above the temperature of the fluid in the conduit so that an increase in fluid mass rate of flow causes cooling of the first temperature sensitive impedance means, hence causing an increase in impedance of the first temperature sensitive impedance means and thus causing an increase in voltage thereacross, said voltage across the first temperature sensitive impedance means thus being a function of the mass rate of flow of the fluid in the conduit, a pair of output connectors, resistance means connected across the output connectors, means connecting the first lead of the first impedance means to one of the output connectors, resistor means, the resistor means having a tap, means connecting the second lead of the first impedance means to the resistor means, resistance means connecting the resistor means to the second output connector, a source of constant voltage electrical energy, means connecting the resistor means and the source of constant voltage in parallel relationship, second temperature sensitive impedance means, the second impedance means having a negative temperature characteristic, means connecting the second impedance means to the second output connector and to the tap of the resistor means, a voltage thus being provided to the output connectors which is a function of the mass rate of fluid flow in the conduit and substantially independent of the temperature of the fluid in the conduit.

5. An instrument of the type described comprising:

a fluid conduit member having fluid therein, a source of constant current electrical energy, first negative temperature characteristic resistance means within the fluid conduit, means for connecting the first negative temperature characteristic resistance means to the source of constant current electrical energy so that the current flow through the first negative temperature characteristic resistance means causes heating thereof to a temperature above the temperature of the fluid in the fluid conduit, the magnitude of the current flow through the first negative temperature characteristic resistance means being of a value to cause self-heating of the first negative temperature characteristic resistance means to a temperature above the temperature of the fluid in the conduit so that an increase in fluid mass rate of flow causes cooling of the first negative temperature characteristic resistance means, hence causing an increase in resistance of the first negative temperature characteristic resistance means and thus causing an increase in voltage thereacross, said voltage across the first negative temperature characteristic resistance means thus being a function of the mass rate of flow of the fluid in the conduit, second negative temperature characteristic resistance means within the conduit, output means, constant voltage means, means connecting the second negative temperature characteristic resistance means to the output means and to the constant voltage means and to the first negative temperature characteristic resistance means, so that a differential voltage is provided to the output means which is a function of the mass rate of fluid flow in the conduit but which is substantially independent of the temperature of the fluid in the conduit.

6. Fluid mass rate flow sensing apparatus for use with a fluid conduit having fluid therein comprising:
  a source of constant current electrical energy,
  a first thermistor within the conduit,
  means connecting the first thermistor to the source of constant current electrical energy, so that current flow through the first thermistor causes heating thereof above the temperature of the fluid in the conduit, the magnitude of the current flow through the first thermistor being of a value to cause self-heating of the first thermistor to a temperature above the temperature of the fluid in the conduit so that an increase in fluid mass rate of flow causes cooling of the first thermistor, hence causing an increase in resistance of the first thermistor and thus causing an increase in voltage thereacross, said voltage across the first thermistor thus being a function of the mass rate of flow of the fluid in the conduit,
  an output circuit,
  a second thermistor within the conduit,
  a third thermistor within the conduit,
  means connecting the second thermistor and the third thermistor to the output circuit and to the first thermistor so that a voltage is provided to the output circuit which is a function of the mass rate of fluid flow in the conduit but substantially independent of the temperature of the fluid in the conduit.

7. Fluid mass rate flow sensing apparatus for use with a fluid conduit having fluid therein comprising:
  a source of constant current electrical energy,
  a first thermistor within the conduit,
  means connecting the first thermistor to the source of constant current electrical energy so that current flow through the first thermistor causes heating thereof above the temperature of the fluid in the conduit,
  a first resistor, a second resistor and a third resistor connected in series relationship, the first resistor being joined to the first thermistor,
  a second thermistor within the conduit,
  means connecting the second thermistor in parallel relationship with the first resistor,
  resistance means connected to the third resistor, the resistance means also being connected to the source of constant current electrical energy,
  a third thermistor within the conduit, the third thermistor being connected to the juncture between the second resistor and the third resistor, the third thermistor also also being connected to the resistance means,
  a source of constant voltage connected across the resistance means,
  there thus being a temperature compensated output voltage across the second resistor, the temperature compensated output voltage being a function of the mass rate of fluid flow in the conduit.

8. Fluid mass rate flow sensing apparatus for use with a fluid conduit fluid having fluid therein comprising:
  a source of constant current electrical energy, a first thermistor within the conduit,
  means connecting the first thermistor to the source of constant current electrical energy so that current flow through the first thermistor causes heating thereof above the temperature of the fluid in the conduit,
  a first resistor and a second resistor,
  means connecting the first resistor and the second resistor in series relationship, the series being connected to the first thermistor,
  output conductor means connected across the first resistor,
  resistance means,
  means connecting the resistance means to the first thermistor and to the second resistor,
  the resistance means having a tap,
  a second thermistor within the conduit,
  means connecting the second thermistor to the tap of the resistance means and to the junction between the first resistor and the second resistor,
  a source of constant voltage,
  means connecting the source of constant voltage across the resistance means,
  there thus being a differential voltage provided to the output conductor means which is a function of the mass rate of fluid flow in the conduit and substantially independent of the temperature of the fluid in the conduit.

9. Apparatus of the type described for use with a conduit having fluid therein,
  first temperature sensitive means within the conduit,
  a source of electrical energy,
  means connecting the first temperature sensitive means to the source of electrical energy so that current flow through the first temperature sensitive means causes self-heating of the first temperature sensitive means above the temperature of the fluid in the conduit, the first temperature sensitive means thus sensing the mass rate of fluid flow in the conduit,
  output means,
  temperature compensation means,
  the temperature compensation means including a source of substantially constant voltage, second temperature sensitive means within the conduit, and compensation circuit means,
  the compensation circuit means joining the first temperature sensitive means to the second temperature sensitive means and to the source of substantially constant voltage and to the output means,
  a voltage thus being provided to the output means which is a function of the mass rate of fluid flow in the conduit but which is substantially independent of the temperature of the fluid in the conduit.

10. Fluid mass rate flow sensing apparatus for use with a fluid conduit having fluid therein comprising:
  a source of constant current electrical energy,
  first impedance means within the conduit, the first impedance means having a negative temperature characteristic,
  means connecting the first impedance means to the source of constant current electrical energy,
  the current flow through the first impedance means being of a value to heat the first impedance means to a temperature above the temperature of the fluid in the conduit, so that an increase in fluid mass rate of flow causes cooling of the first impedance means, hence causing an increase in impedance of the first impedance means and thus causing an increase in voltage thereacross, said voltage across the first impedance means thus being a function of the mass rate of flow of the fluid in the conduit,
  second impedance means within the conduit, the second impedance means having a negative temperature characteristic,
  circuit means connecting the first impedance means to the second impedance means,
  said circuit means including resistor means and constant voltage means connected to the resistor means, a portion of the circuit means providing a voltage which is a function of the mass rate of fluid flow in the conduit and which is substantially independent of the temperature of the fluid in the conduit.

11. Fuid mass rate flow sensing apparatus for use with a fluid conduit having fluid therein comprising:
  a source of constant current electrical energy,
  temperature sensitive impedance means within the conduit, the impedance means having a negative temperature characteristic, means connecting the impedance means to the source of constant current electrical energy, the magnitude of the current flow through the impedance means being of a value to cause self-heating of the impedance means to a temperature above the temperature of the fluid in the conduit so that an increase in fluid mass rate of flow causes a cooling of the impedance means, hence causing an increase in impedance of the impedance means and thus causing an increase in voltage thereacross, output connection means, a source of constant voltage, means connecting the source of constant voltage to the impedance means and to the output connection means so that the voltage at the output connection means is a function of the mass rate of fluid flow in the conduit and substantially independent of the temperature of fluid in the conduit.

12. Fluid mass rate flow sensing apparatus for use with a fluid conduit having fluid therein comprising:

a source of constant current electrical energy, first temperature sensitive impedance means within the conduit and connected to the source of constant current electrical energy, the first impedance means having a negative temperature characteristic, current flow through the first impedance means being of a value to heat the first impedance means above the temperature of the fluid in the conduit so that an increase in fluid mass rate of flow causes cooling of the first impedance means, hence causing an increase in impedance of the first impedance means and thus causing an increase in voltage thereacross, said voltage across the first impedance means thus being a function of the mass rate of fluid flow in the conduit, the first impedance means having a first lead and a second lead so that current flows from one of said leads through the first impedance means and then to the other of said leads, temperature compensation circuitry including a source of constant voltage, a first resistor connected across the source of constant voltage, the source of constant voltage having a first connection and a second connection, the first connection of the source of constant voltage being connected to the first lead of the first impedance means, the first resistor having a tap so that a voltage is provided between the tap and the second connection of the source of constant voltage, second temperature sensitive impedance means within the conduit, the second temperature sensitive impedance means having a first lead and a second lead, the first lead of the second temperature sensitive impedance means being connected to the tap of the first resistor, a second resistor having a first lead connected to the second lead of the first impedance means, the second resistor having a second lead, means connecting the second lead of the second resistor to the second connection of the source of constant voltage, the second lead of the second temperature sensitive impedance means being connected to the second resistor, there thus being a temperature compensated voltage across the second resistor which is a function of the mass flow rate sensed by the first impedance means.

13. Fluid mass rate flow sensing apparatus for use with a fluid conduit having fluid therein comprising:

a source of constant current electrical energy, a first temperature sensitive resistance element, the first temperature sensitive resistance element having a first lead and a second lead, means connecting the first lead and means connecting the second lead of the first temperature sensitive resistance element to the source of constant current electrical energy, the current flow through the first temperature sensitive resistance element being of a value to cause self-heating of the first temperature sensitive resistance element to a temperature above the temperature of the fluid in the conduit so that an increase in fluid mass rate of flow causes cooling of the first temperature sensitive resistance element, hence causing an increase in resistance of the first temperature sensitive resistance element and thus causing an increase in voltage thereacross, said voltage across the first temperature sensitive resistance element thus being a function of the mass rate of flow of the fluid in the conduit, a first resistor, a second resistor, and a third resistor connected in series relationship, the first resistor being joined to the second lead of the first temperature sensitive resistance element, a second temperature sensitive resistance element within the conduit, the second temperature sensitive resistance element being connected in parallel relationship with the first resistor, with the second lead of the second temperature sensitive resistance element being joined to the second lead of the first temperature sensitive resistance element, the second temperature sensitive resistance element having a first lead and a second lead, a fourth resistor, the fourth resistor being connected to the first lead of the first temperature sensitive resistance element and to the first lead of the second temperature sensitive resistance element, resistance means connected to the third resistor at the end of said series of resistors, the resistance means also being connected to the source of constant current electrical energy, a third temperature sensitive resistance element within the conduit, the third temperature sensitive resistance element being connected to the juncture between the second resistor and the third resistor, the third temperature sensitive resistance element also being connected to the resistance means, a source of constant voltage connected across the resistance means, there thus being a temperature compensated output voltage across the second resistor, the temperature compensated output voltage being a function of the mass rate of fluid flow in the conduit.

14. Fluid mass rate flow sensing apparatus for use with a fluid conduit having fluid therein comprising:

a source of constant current electrical energy, first temperature sensitive impedance means within the conduit, the first temperature sensitive impedance means having a negative temperature characteristic, means connecting the first temperature sensitive impedance means to the source of constant current electrical energy, the current flow through the first temperature sensitive impedance means being sufficient to cause self-heating of the first temperature sensitive impedance means to a temperature above the temperature of the fluid in the fluid conduit, output circuit means, temperature compensation circuit means joined to the output circuit means and to the first temperature sensitive impedance means providing a differential voltage to the output circuit means, the temperature compensation circuit means including second temperature sensitive impedance means disposed within the conduit, a source of constant voltage and means joining the source of constant voltage to the second temperature sensitive impedance means, the differential voltage provided to the output circuit means thus being a function of the mass rate of fluid flow in the conduit substantially independent of the temperature and pressure of the fluid in the conduit.

References Cited

UNITED STATES PATENTS

| | | | |
|---|---|---|---|
| 2,769,121 | 10/1956 | Rogoff | 73—204 X |
| 2,831,351 | 4/1958 | Jacobson | 73—204 |
| 2,859,617 | 11/1958 | Adams | 73—204 |
| 2,947,938 | 8/1960 | Bennett | 73—204 X |
| 3,081,628 | 3/1963 | Salera | 73—204 |
| 3,245,252 | 4/1966 | First et al. | 73—88.5 X |

FOREIGN PATENTS 855,294  11/1960  Great Britain.

OTHER REFERENCES

"A Thermistor Flowmeter," by Veprek, Journal of Scientific Instruments, February 1963, vol. 40, pp. 66–68.

RICHARD C. QUEISSER, *Primary Examiner.*

JAMES GILL, *Examiner.*

EDWARD D. GILHOOLY, *Assistant Examiner.*